(12) United States Patent
Yoo (10) Patent No.: US 11,451,752 B2
(45) Date of Patent: Sep. 20, 2022

(54) GRID GAIN CALCULATION CIRCUIT, IMAGE SENSING DEVICE AND OPERATION METHOD OF THE SAME

(71) Applicant: SK hynix Inc., Gyeonggi-do (KR)

(72) Inventor: Jae Yoon Yoo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/089,156

(22) Filed: Nov. 4, 2020

(65) Prior Publication Data

US 2021/0360206 A1 Nov. 18, 2021

(30) Foreign Application Priority Data

May 18, 2020 (KR) .......................... 10-2020-0059127

(51) Int. Cl.
*H04N 5/225* (2006.01)
*H04N 9/04* (2006.01)
*H04N 9/73* (2006.01)

(52) U.S. Cl.
CPC ....... *H04N 9/04515* (2018.08); *H04N 5/2254* (2013.01); *H04N 9/735* (2013.01)

(58) Field of Classification Search
CPC ... H04N 9/04515; H04N 5/2254; H04N 9/735
See application file for complete search history.

(56) References Cited

U.S. PATENT DOCUMENTS

| 9,743,057 | B2 | 8/2017 | Cote et al. | |
|---|---|---|---|---|
| 9,787,922 | B2 | 10/2017 | Lin et al. | |
| 2008/0158396 | A1* | 7/2008 | Fainstain | H04N 5/361 348/246 |
| 2013/0050580 | A1* | 2/2013 | Park | H04N 9/735 348/655 |
| 2017/0269240 | A1* | 9/2017 | Shahar | G01T 7/005 |

\* cited by examiner

*Primary Examiner* — Padma Haliyur
(74) *Attorney, Agent, or Firm* — IP & T Group LLP (57) ABSTRACT

A grid gain calculation circuit includes a region setting component suitable for setting a grid region corresponding to a pixel array; a virtual grid point setting component suitable for setting virtual grid points with respect to outer grid points located on a border of a grid region and with respect to an inner grid point located in an inner area of the grid region close to the outer grid points; and a gain calculation component suitable for calculating a gain of the outer grid points based on a gain of the inner grid point and a gain of the virtual grid points.

20 Claims, 8 Drawing Sheets

FIG. 8

GRID GAIN CALCULATION CIRCUIT, IMAGE SENSING DEVICE AND OPERATION METHOD OF THE SAME

CROSS-REFERENCE TO RELATED APPLICATION

This patent application claims priority to Korean Patent Application No. 10-2020-0059127, filed on May 18, 2020, the entire disclosure of which is incorporated herein by reference.

TECHNICAL FIELD

Various embodiments of the present invention generally relate to a semiconductor device. Particularly, embodiments relate to a grid gain calculation circuit, an image sensing device and an operation method of the same.

BACKGROUND

Recently, the computer environment paradigm has shifted to ubiquitous computing, which enables a computer system to be used anytime, anywhere. As a result, the use of portable electronic devices such as mobile phones, digital cameras, notebook computers and the like have been rapidly increasing.

Recently, due to the rapid development of display devices, the development of image capturing devices having image sensors, such as cameras and camcorders, has accelerated. The image capturing devices can photograph an image and record the photographed image in a recording medium, and simultaneously reproduce the image at any time. Accordingly, as the number of users of image capture devices has increased, the demand for more functionality, i.e., high capability, multiple functions, in such devices has also increased, in addition to demands for compact size, reduced weight, and lower power consumption.

SUMMARY

Embodiments of the invention are directed to a grid gain calculation circuit, an image sensing device and an operation method of the same capable of reducing a calibration calculation error by setting a virtual grid point on an outer area of an outer grid point that is located in a border of a grid region, calculating a gain of the outer grid point based on a gain of the virtual grid point and a gain of an inner grid point, and storing a gain table.

Embodiments of the present invention may apply a stored gain table without an additional calculation irrespective of a size change of a pixel array.

In an embodiment, a grid gain calculation circuit may include a region setting component suitable for setting a grid region corresponding to a pixel array; a virtual grid point setting component suitable for setting virtual grid points with respect to outer grid points located on a border of a grid region and with respect to an inner grid point located in an inner area of the grid region close to the outer grid points; and a gain calculation component suitable for calculating a gain of the outer grid points based on a gain of the inner grid point and a gain of the virtual grid points.

The virtual grid point setting component may set the virtual grid points such that a distance between two vertically neighboring inner grid points is set to be the same as a distance between a vertical direction virtual grid point and the corresponding inner grid point, and such that a distance between two horizontally neighboring inner grid points is set to be the same as a distance between a horizontal direction virtual grid point and the corresponding inner grid point.

The virtual grid point setting component may set external division points with respect to the outer grid points and the inner grid point to the virtual grid points.

The virtual grid point setting component may set a horizontal direction external division point with respect to a horizontal direction outer grid point of the outer grid points and the inner grid point to a horizontal direction virtual grid point, set a vertical direction external division point with respect to a vertical direction outer grid point of the outer grid points and the inner grid point to a vertical direction virtual grid point, set a horizontal direction external division point with respect to a corner direction outer grid point of the outer grid points and the vertical direction outer grid point to a temporary virtual grid point, and set a vertical direction external division point with respect to the horizontal direction virtual grid point and the temporary virtual grid point to a corner direction virtual grid point.

The gain calculation component may calculate a gain of the corner direction outer grid point based on a gain of the vertical direction virtual grid point, a gain of the horizontal direction virtual grid point, a gain of the corner direction virtual grid point and a gain of the inner grid point.

The gain calculation component may calculate the gain of the corner direction outer grid point according to the following equation:

$$\text{gain}(x, y) = \frac{\left\{ \begin{array}{l} \text{gain}(x_1, y_1) \times d_{x2} \times d_{y2} + \text{gain}(x_2, y_2) \times d_{x1} \times d_{y2} + \\ \text{gain}(x_3, y_3) \times d_{x2} \times d_{y1} + \text{gain}(x_4, y_4) \times d_{x1} \times d_{y1} \end{array} \right\}}{(d_{x1} + d_{x2}) \times (d_{y1} + d_{y2})}$$

where 'gain(x,y)' denotes the gain of the corner direction outer grid point, 'gain($x_1,y_1$)' denotes the gain of the corner direction virtual grid point, 'gain($x_2,y_2$)' denotes the gain of the vertical direction virtual gird point, 'gain($x_3,y_3$)' denotes the gain of the horizontal direction virtual grid point, 'gain($x_4,y_4$)' denotes the gain of the inner grid point, '$dx_1$' denotes a horizontal distance between the corner direction outer grid point and the temporary virtual grid point, '$dx_2$' denotes a horizontal distance between the vertical direction outer grid point and the corner direction outer grid point, '$dy_1$' denotes a vertical distance between the vertical direction virtual grid point and the corner direction outer grid point, and '$dy_2$' denotes a vertical distance between the horizontal direction outer grid point and the corner direction outer grid point.

The gain calculation component may set the gain of each of the vertical direction virtual grid point, the horizontal direction virtual grid point and the corner direction virtual grid point to be the same as the gain of the inner grid point.

In another embodiment, an image sensing device may include an image sensor including a pixel array having a plurality of pixels; an image signal processor suitable for processing an output signal of the image sensor; and a grid gain calculation circuit, wherein the grid gain calculation circuit comprises a region setting component suitable for setting a grid region corresponding to the pixel array; a virtual grid point setting component suitable for setting virtual grid points with respect to outer grid points located on a border of a grid region and with respect to an inner grid point located in an inner area of the grid region close to the outer grid points; and a calculation component suitable for calculating a gain of the outer grid points based on a gain of the inner grid point and a gain of the virtual grid points.

The virtual grid point setting component may set the virtual grid points such that a distance between the inner grid point and another inner grid point is the same as a distance between each of the virtual grid points and the inner grid point.

The virtual grid point setting component may set external division points with respect to the outer grid points and the inner grid point to the virtual grid points.

The virtual grid point setting component may set a horizontal direction external division point with respect to a horizontal direction outer grid point of the outer grid points and the inner grid point to a horizontal direction virtual grid point, set a vertical direction external division point with respect to a vertical direction outer grid point of the outer grid points and the inner grid point to a vertical direction virtual grid point, set a horizontal direction external division point with respect to a corner direction outer grid point of the outer grid points and the vertical direction outer grid point to a temporary virtual grid point, and set a vertical direction external division point with respect to the horizontal direction virtual grid point and the temporary virtual grid point to a corner direction virtual grid point.

The gain calculation component may calculate a gain of the corner direction outer grid point based on a gain of the vertical direction virtual grid point, a gain of the horizontal direction virtual grid point, a gain of the corner direction virtual grid point and a gain of the inner grid point.

The gain calculation component calculates the gain of the corner direction outer grid point according to the following equation:

$$\text{gain}(x, y) = \frac{\left\{\begin{array}{l}\text{gain}(x_1, y_1) \times d_{x2} \times d_{y2} + \text{gain}(x_2, y_2) \times d_{x1} \times d_{y2} + \\ \text{gain}(x_3, y_3) \times d_{x2} \times d_{y1} + \text{gain}(x_4, y_4) \times d_{x1} \times d_{y1}\end{array}\right\}}{(d_{x1} + d_{x2}) \times (d_{y1} + d_{y2})}$$

where 'gain(x,y)' denotes the gain of the corner direction outer grid point, 'gain($x_1$,$y_1$)' denotes the gain of the corner direction virtual grid point, 'gain($x_2$,$y_2$)' denotes the gain of the vertical direction virtual gird point, 'gain($x_3$,$y_3$)' denotes the gain of the horizontal direction virtual grid point, 'gain($x_4$,$y_4$)' denotes the gain of the inner grid point, '$dx_1$' denotes a horizontal distance between the corner direction outer grid point and the temporary virtual grid point, '$dx_2$' denotes a horizontal distance between the vertical direction outer grid point and the corner direction outer grid point, '$dy_1$' denotes a vertical distance between the vertical direction virtual grid point and the corner direction outer grid point, and '$dy_2$' denotes a vertical distance between the horizontal direction outer grid point and the corner direction outer grid point.

The gain calculation component may set the gain of each of the vertical direction virtual grid point, the horizontal direction virtual grid point and the corner direction virtual grid point to be the same as the gain of the inner grid point.

In another embodiment, an operation method of an image sensing device may include setting a grid region corresponding to a pixel array; setting virtual grid points with respect to outer grid points located on a border of a grid region and with respect to an inner grid point located in an inner area of the grid region close to the outer grid points; and calculating a gain of the outer grid points based on a gain of the inner grid point and a gain of the virtual grid points.

The setting of the virtual grid points may include setting the virtual grid points such that a distance between the inner grid point and another inner grid point is the same as a distance between each of the virtual grid points and the inner grid point.

The setting of the virtual grid points may include setting external division points with respect to the outer grid points and the inner grid point to the virtual grid points.

The setting of the virtual grid points may include setting a horizontal direction external division point with respect to a horizontal direction outer grid point of the outer grid points and the inner grid point to a horizontal direction virtual grid point, set a vertical direction external division point with respect to a vertical direction outer grid point of the outer grid points and the inner grid point to a vertical direction virtual grid point, set a horizontal direction external division point with respect to a corner direction outer grid point of the outer grid points and the vertical direction outer grid point to a temporary virtual grid point, and set a vertical direction external division point with respect to the horizontal direction virtual grid point and the temporary virtual grid point to a corner direction virtual grid point.

The calculating of the gain of the outer grid points may include calculating a gain of the corner direction outer grid point using a gain of the vertical direction virtual grid point, a gain of the horizontal direction virtual grid point, a gain of the corner direction virtual grid point and a gain of the inner grid point.

The calculating of the gain of the outer grid points may include calculating the gain of each of the vertical direction virtual grid point, the horizontal direction virtual grid point and the corner direction virtual grid point to be the same as the gain of the inner grid point.

In another embodiment, an image sensing device may include an image sensor including a pixel array having a plurality of pixels; and a grid gain circuit suitable for: determining a grid region having a plurality of squares and a plurality of rectangles, which correspond to the pixel array; determining an inner area including the plurality of squares and an outer area including the plurality of rectangles, from the grid region; determining corner regions of the outer area, each corner region including an inner grid point in the inner area and outer grid points; determining virtual grid points such that each corner region has the same size as each square; and calculating a gain of the outer grid points based on a gain of the inner grid point and a gain of the virtual grid points.

BRIEF DESCRIPTION OF THE DRAWINGS

The description herein makes reference to the accompanying drawings wherein like reference numerals refer to like parts throughout the several views.

DETAILED DESCRIPTION

Various examples of the present invention are described below in more detail with reference to the accompanying drawings. The invention, however, may be realized in other embodiments, forms and variations thereof and thus should not be construed as being limited to the embodiments set forth herein. Rather, the described embodiments are provided so that this present invention is thorough and complete and fully conveys the present invention to those skilled in the art to which this invention pertains. Throughout the specification, reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance may be referred to as a second or third element in another instance without indicating any change in the element itself.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements. Communication between two elements, whether directly or indirectly connected/coupled, may be wired or wireless, unless the context indicates otherwise. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention.

As used herein, singular forms are intended to include the plural forms and vice versa, unless the context clearly indicates otherwise. The articles 'a' and 'an' as used in this application and the appended claims should generally be construed to mean 'one or more' unless specified otherwise or it is clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains. It will be further understood that terms, such as those defined in commonly used dictionaries, should be interpreted as having a meaning that is consistent with their meaning in the context of the present invention and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the present invention are described in detail with reference to the accompanied drawings.

Figure 1:
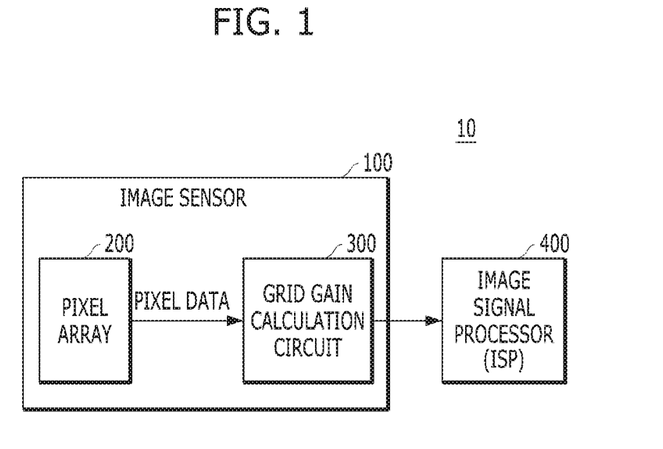
FIG. 1 is a block diagram illustrating an image sensing device in accordance with an embodiment of the present invention.

FIG. 1 is a block diagram illustrating an image sensing device 10 in accordance with an embodiment of the present invention.

Referring to FIG. 1, the image sensing device 10 may include an image sensor 100 and an image signal processor (ISP) 400.

The image sensing device 10 may be implemented in any suitable electronic device, such as a personal computer (PC) or a mobile computing device that can receive and process image data.

More specifically, the image sensing device 10 may be implemented in a laptop computer, a mobile phone, a smart phone, a tablet, a personal digital assistant (PDA), an enterprise digital assistant (EDA), a digital still camera, a digital video camera, a portable multimedia player (PMP), a mobile internet device (MID), a wearable computer, an internet of things (IoT), or an internet of everything (IoE).

The image sensor 100 may include a pixel array 200 and a grid gain calculation circuit 300.

The pixel array 200 may include a plurality of pixels. Herein, a pixel may represent pixel data in any suitable format or color space, e.g., RGB, YUV or YCbCr, but the invention not limited to these data formats.

The grid gain calculation circuit 300 may set virtual grid points to an outer area of outer grid points, which outer area is located along a border of a grid region corresponding to a pixel array during a calibration operation, and an inner grid point, which is located in an inner area that is internally close to the outer grid points. The grid gain calculation circuit 300 may calculate a gain of the outer grid point based on a gain of the virtual grid point and a gain of the inner grid point.

The grid gain calculation circuit 300, which may be configured and operate as shown in FIGS. 3 to 7, may be implemented as the grid gain calculation circuit 300 shown in FIG. 1.

The detailed configuration and operations of the grid calculation circuit 300 are described in detail below with reference to FIGS. 3 to 7.

The image signal processor 400 may be implemented in an integrated circuit, a system on chip (SoC) or a mobile application processor. The image signal processor 400 may process an output signal of the image sensor 300. That is, the image signal processor 400 may receive and process an image output signal outputted from the grid gain calculation circuit 300 in the image sensor 100.

More specifically, the image signal processor 400 may generate RGB image data from a Bayer pattern corresponding to pixel data. For example, the image signal processor 400 may process a Bayer pattern such that the image data is displayed in a display, and may transfer processed image data to an interface.

In an embodiment of the present invention, each of the image sensor 100 and the image signal processor 400 may be implemented as a chip, or a multi-chip package (MCP). In another embodiment of the present invention, the image sensor 100 and the image signal processor 400 may be implemented as a single chip.

Figure 2:
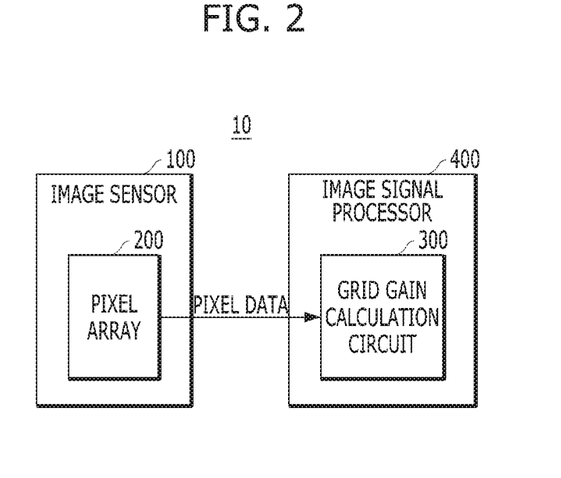
FIG. 2 is a block diagram illustrating an image sensing device in accordance with another embodiment of the present invention.

FIG. 2 is a block diagram illustrating an image sensing device 10 in accordance with another embodiment of the present invention.

Referring to FIG. 2, the image sensing device 10 may include an image sensor 100 and an image signal processor (ISP) 400.

The grid gain calculation circuit 300, which may be configured and operate as shown in FIGS. 3 to 7, may be implemented as the grid gain calculation circuit 300 shown in FIG. 2.

The structure and operation of the image sensing device 10 in FIG. 2 are substantially the same as the structure and operation of the image sensing device 10 in FIG. 1, except that, in the embodiment of FIG. 2, the grid gain calculation circuit 300 is implemented in the image signal processor 400, not in the image sensor 100 as in the embodiment of FIG. 1. Thus, further description of the image sensor device 10 in FIG. 2 is omitted here.

Hereinafter, the grid gain calculation circuit 300 in FIG. 2 is described with reference to FIGS. 3 to 6.

Figure 3:
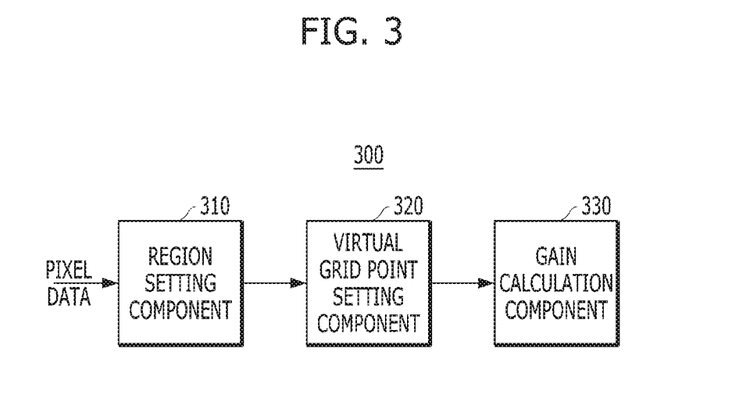
FIG. 3 is a block diagram illustrating a grid gain calculation circuit in accordance with another embodiment of the present invention.
Figure 4:
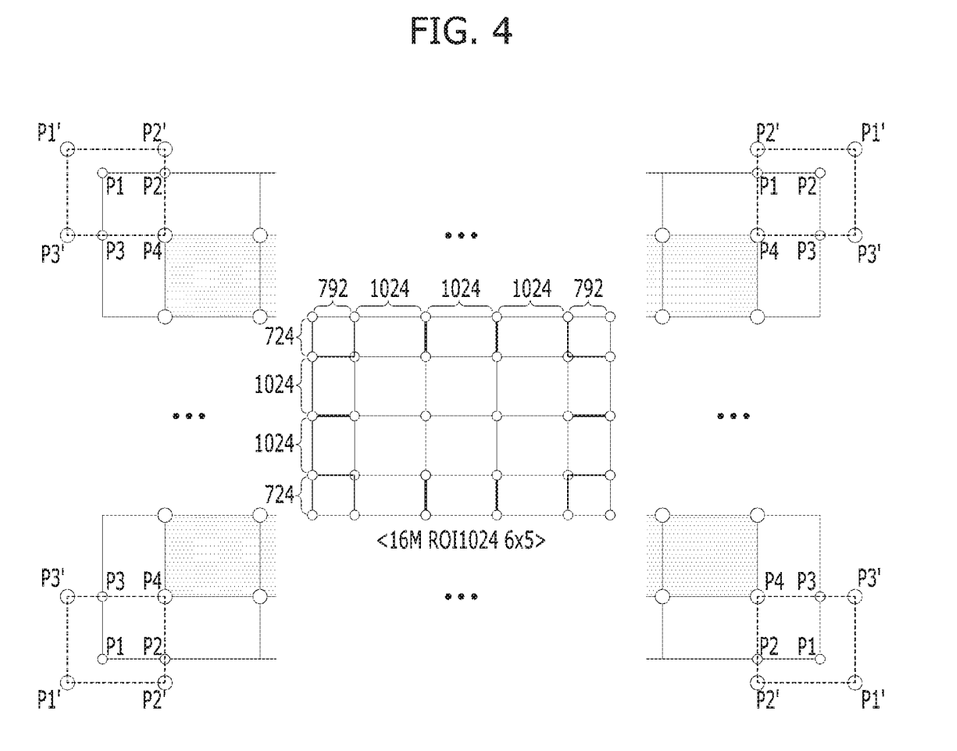
FIG. 4 is a diagram illustrating a virtual grid point that is set by a virtual grid point setting component, such as that shown in FIG. 3.
Figure 5:
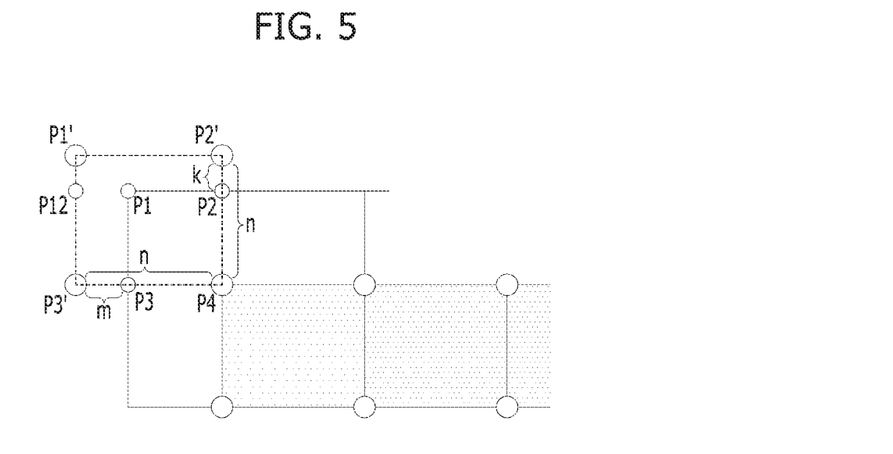
FIG. 5 is an expanded diagram illustrating a virtual grid point, such as that shown in FIG. 4.
Figure 6:
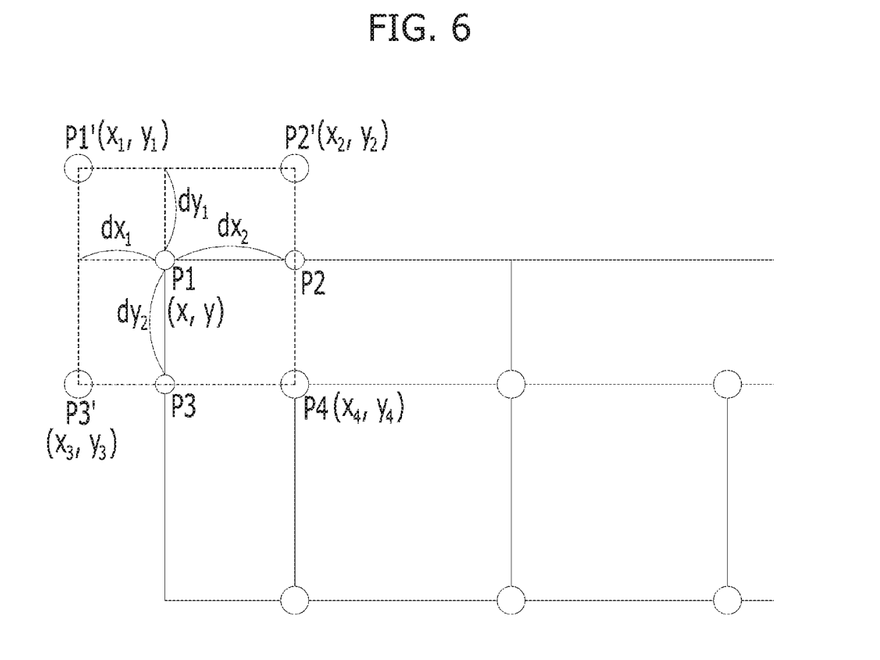
FIG. 6 is a diagram illustrating a gain calculation of an outer grid point using a virtual grid point, such as that shown in FIG. 4.

FIG. 3 is a block diagram illustrating the grid gain calculation circuit 300 in accordance with an embodiment of the present invention. FIG. 4 is a diagram illustrating virtual grid points that are set by a virtual grid point setting component 320 shown in FIG. 3. FIG. 5 is an expanded diagram illustrating virtual grid points shown in FIG. 4. FIG. 6 is a diagram illustrating a gain calculation of outer grid points using virtual grid points shown in FIG. 4.

Referring to FIG. a, the grid gain calculation circuit 300 may include a region setting component 310, the virtual grid point setting component 320 and a gain calculation component 330.

The region setting component 310 may set a grid region corresponding to a pixel array. In an embodiment of the present invention, a grid region having 16M ROI 1024 size is shown and explained.

Referring to FIG. 4, the inner grid region includes 6 inner regions, each having a square shape (i.e., 1024×1024). Since the inner grid region includes 6 1024×1024 size regions, an interpolation calculation may be performed without additional calculation burden during the interpolation calculation on an inner point of the inner grid region.

Outer grid points P1, P2 and P3 represent points located on a border of the grid region. There are four sets of outer grid points P1, P2 and P3 respectively defining the four corners of the grid region. The inner grid point P4 for each set of outer grid points P1, P2 and P3 neighbors those. Virtual grid points P1', P2' and P3' are virtually set to an outer portion of each set of outer grid points P1, P2 and P3 based on the corresponding outer grid points P1, P2 and P3 and corresponding inner grid point P4.

The grid region has 4 corner regions, defined by the respective sets of outer grid points. Each corner region has the same rectangular size (i.e., 792×724). Since 4 corner regions have the same rectangular size, an additional calculation logic is performed for the interpolation calculation on the point of the corner region of the grid region. Also, the size of the grid region is not limited to 16M ROI 1024; rather, the grid region may be any suitable size. In this case, the outer grid point region would be different, which in turn, would change the calculation logic.

In order to solve issues noted above, in embodiments of the present invention, virtual grid points P1', P2' and P3' may be set such that 4 same sized corner regions (i.e., 792×724 regions) are formed relative to the inner grid region having multiple 1024×1024 regions.

Referring to FIG. 5, the virtual grid point setting component 320 may set virtual grid points to an outer area of the outer grid points P1, P2 and P3 based on the outer grid points P1, P2 and P3, and the inner grid point P4. The outer grid points P1, P2 and P3 are located on a border of the grid region. The inner grid point P4 is located in an inner area neighboring the outer grid points P1, P2 and P3. FIG. 5 shows the arrangement for one corner of the grid region; however, the virtual grid setting component 320 sets virtual grid points with respect to each of the four corners of the grid region in the same manner.

In some embodiments, a distance between two vertically neighboring inner grid points P4, may be set to be the same as a distance between a vertical direction virtual grid point P2' and the corresponding inner grid point P4. A distance between two horizontally neighboring inner grid points P4, may be set to be the same as a distance between a horizontal direction virtual grid point P3° and the corresponding inner grid point P4.

Herein, an external division point with respect to the outer grid points P1, P2 and P3 and the inner grid point P4 may be set to each of the virtual grid points P1', P2' and P3'.

More specifically, a horizontal direction external division point with respect to outer grid point P3 and the inner grid point P4 may be set to a horizontal direction virtual grid point as expressed in equation 1.

$$P3' = \frac{n*P3 - m*P4}{n - m} \quad \text{[equation 1]}$$

In equation 1, 'n' denotes a distance between the inner grid point P4 and the horizontal direction virtual grid point P3', and 'm' denotes a distance between the horizontal direction virtual grid point P3' and a horizontal direction outer grid point P3.

Also, a vertical direction external division point with respect to outer grid point P2 and the inner grid point P4 may be set to a vertical direction virtual grid point P2' as expressed in equation 2.

$$P2' = \frac{n*P2 - k*P4}{n - k} \quad \text{[equation 2]}$$

In equation 2, 'n' denotes a distance between the inner grid point P4 and the vertical direction virtual grid point P2', and 'k' denotes a distance between the vertical direction virtual grid point P2' and a vertical direction outer grid point P2.

Also, a horizontal direction external division point external to outer grid point P2 and along the line defined by P2 and outer grid point P1 may be set to a temporary virtual grid point P12 as expressed in equation 3.

$$P12 = \frac{n*P1 - m*P2}{n - m} \quad \text{[equation 3]}$$

In equation 3, 'n' denotes a distance between the inner grid point P4 and the horizontal direction virtual grid point P3', and 'm' denotes a distance between the horizontal direction virtual grid point P3' and a horizontal direction outer grid point P3.

Also, a vertical direction external division point with respect to the horizontal direction virtual grid point P3' and the temporary virtual grid point P12 may be set to a corner direction virtual grid point P1' as expressed in equation 4.

$$P1' = \frac{n * P12 - k * P3'}{n - k} \quad \text{[equation 4]}$$

In equation 4, 'n' denotes a distance between the inner grid point P4 and the horizontal direction virtual grid point P3', and 'k' denotes a distance between the vertical direction virtual grid point P2' and a vertical direction outer grid point P2.

Referring to FIG. 6, the gain calculation component 330 may calculate a gain of the outer grid points P1, P2 and P3 based on a gain of the inner grid point P4 and a gain of the virtual grid points P1', P2' and P3', which are set by the virtual grid point setting component 320 as expressed in equation 5 set forth immediately below.

$$\text{gain}(x, y) = \frac{\left\{ \begin{array}{l} \text{gain}(x_1, y_1) \times d_{x2} \times d_{y2} + \text{gain}(x_2, y_2) \times d_{x1} \times d_{y2} + \\ \text{gain}(x_3, y_3) \times d_{x2} \times d_{y1} + \text{gain}(x_4, y_4) \times d_{x1} \times d_{y1} \end{array} \right\}}{(d_{x1} + d_{x2}) \times (d_{y1} + d_{y2})}$$

In equation 5, 'gain(x,y)' denotes the gain of the corner direction outer grid point P1, 'gain($x_1,y_1$)' denotes the gain of the corner direction virtual grid point P1', 'gain($x_2,y_2$)' denotes the gain of the vertical direction virtual gird point P2', 'gain($x_3,y_3$) denotes the gain of the horizontal direction virtual grid point P3', 'gain($x_4,y_4$) denotes the gain of the inner grid point P4, '$dx_1$' denotes a horizontal distance between the corner direction outer grid point P1 and the temporary virtual grid point P12, '$dx_2$' denotes a horizontal distance between the vertical direction outer grid point P2 and the corner direction outer grid point P1, '$dy_1$' denotes a vertical distance between the vertical direction virtual grid point P2' and the corner direction outer grid point P1, and '$dy_2$' denotes a vertical distance between the horizontal direction outer grid point P3 and the corner direction outer grid point P1.

As the gain of the outer grid points P1, P2 and P3 are calculated by the equation 5, a gain table may be efficiently acquired irrespective of a size of the grid region during a calibration operation.

Hereinafter, an operation method of an image sensing device in accordance with an embodiment of the present invention will be described with reference to FIG. 7.

Figure 7:
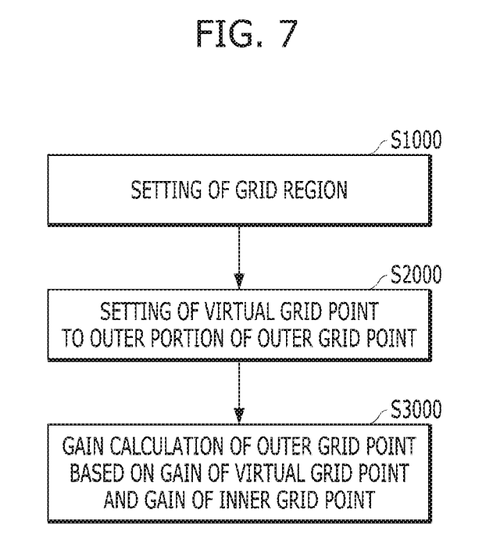
FIG. 7 is a flow chart illustrating an operation of an image sensing device in accordance with an embodiment of the present invention.

FIG. 7 is a flow chart illustrating an operation of an image sensing device (e.g., image sensing device 10 in FIG. 2) in accordance with an embodiment of the present invention.

Referring to FIG. 7, an operation method of an image sensing device may include a grid region setting operation S1000, a virtual grid point setting operation S2000 and outer grid point gain calculation operation S3000.

At operation S1000, a grid region corresponding to a pixel array may be set during a calibration operation.

As shown in FIG. 4, the grid region may have 16M ROI 1024 size.

That is, the grid region in FIG. 4 may have an inner grid region having 6 regions, each of 1024×1024 size, and an outer corner grid region having 4 regions, each of 792×724.

At operation S2000, the virtual outer grid points P1', P2' and P3' may be set to the outer area of the outer grid points P1, P2 and P3 based on the outer grid points P1, P2 and P3, and the inner grid point P4 located in an inner area of the grid region. The outer grid points P1, P2 and P3 are located on a border of the grid region. The inner grid point P4 neighbors the outer grid points P1, P2 and P3.

The virtual grid points P1', P2' and P3° may be set externally with respect to the outer grid points P1, P2 and P3, respectively.

The virtual grid points P1', P2° and P3' may be set such that a distance between two vertically neighboring inner grid points P4 may be set to be the same as a distance between a vertical direction virtual grid point P2' and the corresponding inner grid point P4. A distance between two horizontally neighboring inner grid points P4 may be set to be the same as a distance between a horizontal direction virtual grid point P3' and the corresponding inner grid point P4.

Referring to FIG. 5, in an embodiment, a horizontal direction external division point between a horizontal direction outer grid point P3 of the outer grid points P1, P2 and P3 and the inner grid point P4 may be set to a horizontal direction virtual grid point as expressed in equation 1.

In an embodiment, a vertical direction external division point between a vertical direction outer grid point P2 of the outer grid points P1, P2 and P3 and the inner grid point P4 may be set to a vertical direction virtual grid point P2' as expressed in equation 2.

In an embodiment, a horizontal direction external division point between a corner direction outer grid point P1 of the outer grid points P1, P2 and P3 and the vertical direction outer grid point P2 may be set to a temporary virtual grid point P12 as expressed in equation 3.

In an embodiment, a vertical direction external division point between the horizontal direction virtual grid point P3' and the temporary virtual grid point P12 may be set to a corner direction virtual grid point P1' as expressed in equation 4.

At operation S3000, a gain of the corner direction outer grid point P1 may be calculated using a gain of the inner grid point P4 and a gain of the virtual grid points P1', P2' and P3'.

Referring to FIG. 6, in an embodiment, the gain of the corner direction outer grid point P1 may be calculated using a gain of the vertical direction virtual grid point P2', a gain of the horizontal direction virtual grid point P3', a gain of the corner direction virtual grid point P1' and a gain of the inner grid point P4 as expressed in equation 5.

Herein, each of the gain of the vertical direction virtual grid point P2', the gain of the horizontal direction virtual grid point P3' and the gain of the corner direction virtual grid point P1 may be the same as the gain of the inner grid point P4.

Hereinafter, a system configured to implement an image sensing device in accordance with an embodiment of the present invention is described in detail with reference to FIG. 8.

Figure 8:
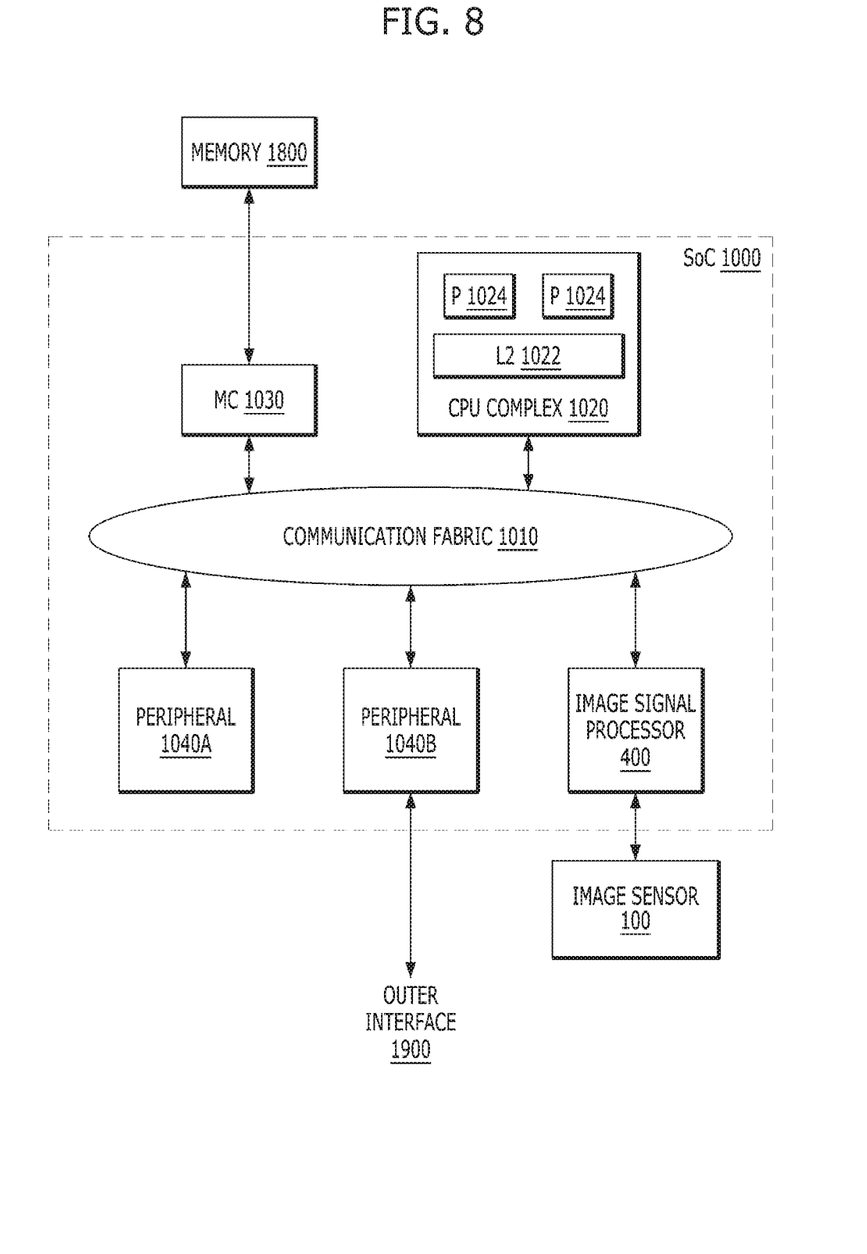
FIG. 8 is a block diagram illustrating a system configured to implement an image sensing device in accordance with another embodiment of the present invention.

FIG. 8 illustrates a system configured to implement an image sensing device in accordance with an embodiment of the present invention.

In various embodiments, the system of FIG. 8 may be any of various types of computing devices, including, but not limited to, a personal computer system, desktop computer, laptop or notebook computer, mainframe computer system, handheld computing device, cellular phone, smartphone, mobile phone, workstation, network computer, a consumer device, application server, storage device, intelligent display, a peripheral device such as a switch, modem, router, etc., or in general any type of computing device. According to an embodiment, the system of FIG. 8 may be a system-on-a-chip (SoC).

As implied by the name, the components of the SoC 1000 may be integrated onto a single semiconductor substrate as an integrated circuit "chip." In some embodiments, the components may be implemented on two or more discrete chips in a system. The following description is in the context of the SoC 1000, which is an example implementation.

In the illustrated embodiment, the components of the SoC 1000 include a central processing unit (CPU) complex 1020, on-chip peripheral components 1040A-1040B (more briefly, "peripherals"), a memory controller (MC) 1030, a communication fabric 1010, and an image signal processor 400. SoC 1000 may also be coupled to additional components, such as a memory 1800 and an image sensor 100. The components 1020, 1030, 1040A-1040B, and 400 may all be coupled to the communication fabric 1010. The memory controller 1030 may be coupled to the memory 1800 during use, and the peripheral 10406 may be coupled to an external interface 1900 during use. Additionally, the image signal processor 400 may be coupled to the image sensor 100 during use.

The peripherals 1040A-1040B may be any set of additional hardware functionality in the SoC 1000. For example, the peripherals 1040A-1040B may include display controllers configured to display video data on one or more display devices, graphics processing units (GPUs), video encoder/decoders, scalers, rotators, blenders, etc.

The image signal processor 400 may, in some embodiments, be part of another video peripheral configured to process image capture data from the image sensor 100 (or other image sensor). The image signal processor 400 and the image sensor 100 may be configured to implement the image sensor 400 and the image sensor 100 shown in FIGS. 1 to 7.

The peripherals 1040A-1040B may also include audio peripherals such as microphones, speakers, interfaces to microphones and speakers, audio processors, digital signal processors, mixers, etc. The peripherals 1040A-1040B (e.g., peripheral 1040B) may include peripheral interface controllers for various interfaces 1900 external to the SoC 1000 including interfaces such as Universal Serial Bus (USB), peripheral component interconnect (PCI) including PCI Express (PCIe), serial and parallel ports, etc. The peripherals 1040A-1040B may further include networking peripherals such as media access controllers (MACs). In general, any set of hardware may be included, according to various embodiments.

The CPU complex 1020 may include one or more processors (Ps) 1024 that serve as the CPU of the SoC 1000. The processor(s) 1024 may execute the main control software of the system, such as an operating system. Generally, software executed by the CPU may control the other components of the system to realize the desired functionality of the system. The processors 1024 may also execute other software, such as application programs. The application programs may provide user functionality and may rely on the operating system for lower level device control. Accordingly, the processors 1024 may also be referred to as application processors. The CPU complex 1020 may further include other hardware such as the L2 cache 1022 and/or and interface to the other components of the system (e.g. an interface to the communication fabric 1010).

Generally, a processor may include any circuitry and/or microcode configured to execute instructions defined in an instruction set architecture implemented by the processor. The instructions and data operated on by the processor(s) in response to executing the instructions may generally be stored in the memory 1800, although certain instructions may be defined for direct processor access to peripherals as well. Processors may encompass processor cores implemented on an integrated circuit with other components as a system on a chip (SoC 1000) or other levels of integration. Processors may further encompass discrete microprocessors, processor cores and/or microprocessors integrated into multichip module implementations, processors implemented as multiple integrated circuits, etc.

The memory controller 1030 may generally include the circuitry for receiving memory operations from the other components of the SoC 1000 and for accessing the memory 1800 to complete the memory operations. The memory controller 1030 may be configured to access any type of memory 1800. For example, the memory 1800 may be a static random access memory (SRAM), or a dynamic RAM (DRAM) such as a synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 1030 may include queues for memory operations, for ordering (and potentially reordering) the operations and presenting the operations to the memory 1800. The memory controller 1030 may further include data buffers to store write data awaiting write to memory and read data awaiting return to the source of the memory operation. In some embodiments, the memory controller 1030 may include a memory cache to store recently accessed memory data. In SoC implementations, the memory cache may reduce power consumption in the SoC by avoiding re-access of data from the memory 1800 if it is expected to be accessed again soon. In some cases, the memory cache may also be referred to as a system cache, as opposed to private caches such as the L2 cache 1022 or caches in the processors 1024, which serve only certain components. Additionally, in some embodiments, a system cache need not be located within the memory controller 1030.

In an embodiment, the memory 1800 may be packaged with the SoC 1000 in a chip-on-chip or package-on-package configuration. A multichip module configuration of the SoC 1000 and the memory 1800 may be used as well. Such configurations may be relatively more secure (in terms of data observability) than transmissions to other components in the system (e.g. to the end points). Accordingly, protected data may reside in the memory 1800 unencrypted, whereas the protected data may be encrypted for exchange between the SoC 1000 and external endpoints.

The communication fabric 1010 may be any communication interconnect and protocol for communicating among the components of the SoC 1000. The communication fabric 1010 may be bus-based, including shared bus configurations, cross bar configurations, and hierarchical buses with bridges. The communication fabric 1010 may also be packet-based, and may be hierarchical with bridges, cross bar, point-to-point, or other interconnects.

It is noted that the number of components of the SoC 1000 (and the number of subcomponents within the CPU complex 1020) may vary from embodiment to embodiment. There may be more or fewer of each component/subcomponent than the number shown in FIG. 8.

In some embodiments, the methods described herein may be implemented by a computer program product, or software. In some embodiments, a non-transitory, computer-readable storage medium may have stored thereon instructions which may be used to program a computer system (or other electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

As described above, a grid calculation circuit, an image sensing device and an operation method of the same in accordance with embodiments of the present invention may reduce a calibration calculation error by setting a virtual grid point on an outer area of an outer grid point that is located in a border of a grid region, calculating a gain of the outer grid point based on a gain of the virtual grid point and a gain of an inner grid point, and storing a gain table.

In particular, a grid gain calculation circuit, an image sensing device and an operation method of the same in embodiments of the present invention may implement a stored gain table without an additional calculation irrespective of the size of a pixel array.

While the present invention is illustrated and described in the context of specific embodiments, it will be apparent to those skilled in the art in light of the present disclosure that various changes and modifications may be made without departing from the spirit and scope of the invention as defined in the following claims. The present invention encompasses all such changes and modifications to the extent they fall within the scope of the claims.

What is claimed is:

1. A grid gain calculation circuit, comprising:
a region setting component suitable for setting a grid region corresponding to a pixel array during a calibration operation;
a virtual grid point setting component suitable for setting virtual grid points with respect to outer grid points located on a border of a grid region and with respect to an inner grid point located in an inner area of the grid region close to the outer grid points; and
a gain calculation component suitable for calculating a gain of the outer grid points based on a gain of the inner grid point and a gain of the virtual grid points,
wherein the gain is associated with the calibration operation for balancing a pixel color level,
wherein the virtual grid points are virtually set to an outer area of each set of the outer grid points based on the corresponding outer grid points and the corresponding inner grid point.

2. The grid gain calculation circuit of claim 1, wherein the virtual grid point setting component sets the virtual grid points such that a distance between two vertically neighboring inner grid points is set to be the same as a distance between a vertical direction virtual grid point and the corresponding inner grid point, and such that a distance between two horizontally neighboring inner grid points is set to be the same as a distance between a horizontal direction virtual grid point and the corresponding inner grid point.

3. The grid gain calculation circuit of claim 2, wherein the virtual grid point setting component sets external division points with respect to the outer grid points and the inner grid point to the virtual grid points.

4. The grid gain calculation circuit of claim 3, wherein the virtual grid point setting component sets a horizontal direction external division point with respect to a horizontal direction outer grid point of the outer grid points and the inner grid point to a horizontal direction virtual grid point, sets a vertical direction external division point with respect to a vertical direction outer grid point of the outer grid points and the inner grid point to a vertical direction virtual grid point, sets a horizontal direction external division point with respect to a corner direction outer grid point of the outer grid points and the vertical direction outer grid point to a temporary virtual grid point, and sets a vertical direction external division point with respect to the horizontal direction virtual grid point and the temporary virtual grid point to a corner direction virtual grid point.

5. The grid gain calculation circuit of claim 4, wherein the gain calculation component calculates a gain of the corner direction outer grid point based on a gain of the vertical direction virtual grid point, a gain of the horizontal direction virtual grid point, a gain of the corner direction virtual grid point and a gain of the inner grid point.

6. The grid gain calculation circuit of claim 5, wherein the gain calculation component calculates the gain of the corner direction outer grid point according to the following equation:

$$\text{gain}(x, y) = \frac{\left\{\begin{array}{l}\text{gain}(x_1, y_1) \times d_{x2} \times d_{y2} + \text{gain}(x_2, y_2) \times d_{x1} \times d_{y2} + \\ \text{gain}(x_3, y_3) \times d_{x2} \times d_{y1} + \text{gain}(x_4, y_4) \times d_{x1} \times d_{y1}\end{array}\right\}}{(d_{x1} + d_{x2}) \times (d_{y1} + d_{y2})}$$

where 'gain(x,y)' denotes the gain of the corner direction outer grid point, 'gain(x1,y1)' denotes the gain of the corner direction virtual grid point, 'gain(x2,y2)' denotes the gain of the vertical direction virtual gird point, 'gain(x3,y3)' denotes the gain of the horizontal direction virtual grid point, 'gain(x4,y4)' denotes the gain of the inner grid point, 'dx1' denotes a horizontal distance between the corner direction outer grid point and the temporary virtual grid point, 'dx2' denotes a horizontal distance between the vertical direction outer grid point and the corner direction outer grid point, 'dy1' denotes a vertical distance between the vertical direction virtual grid point and the corner direction outer grid point, and 'dy2' denotes a vertical distance between the horizontal direction outer grid point and the corner direction outer grid point.

7. The grid gain calculation circuit of claim 5, wherein the gain calculation component sets the gain of each of the vertical direction virtual grid point, the horizontal direction virtual grid point and the corner direction virtual grid point to be the same as the gain of the inner grid point.

8. An image sensing device, comprising:
an image sensor including a pixel array having a plurality of pixels;
an image signal processor suitable for processing an output signal of the image sensor; and
a grid gain calculation circuit,
wherein the grid gain calculation circuit comprises
a region setting component suitable for setting a grid region corresponding to the pixel array during a calibration operation;

a virtual grid point setting component suitable for setting virtual grid points with respect to outer grid points located on a border of a grid region and with respect to an inner grid point located in an inner area of the grid region close to the outer grid points; and a calculation component suitable for calculating a gain of the outer grid points based on a gain of the inner grid point and a gain of the virtual grid points, wherein the gain is associated with the calibration operation for balancing a pixel color level, wherein the virtual grid points are virtually set to an outer area of each set of the outer grid points based on the corresponding outer grid points and the corresponding inner grid point.

9. The image sensing device of claim 8, wherein the virtual grid point setting component sets the virtual grid points such that a distance between the inner grid point and another inner grid point is the same as a distance between each of the virtual grid points and the inner grid point.

10. The image sensing device of claim 9, wherein the virtual grid point setting component sets external division points with respect to the outer grid points and the inner grid point to the virtual grid points.

11. The image sensing device of claim 10, wherein the virtual grid point setting component sets a horizontal direction external division point with respect to a horizontal direction outer grid point of the outer grid points and the inner grid point to a horizontal direction virtual grid point, sets a vertical direction external division point with respect to a vertical direction outer grid point of the outer grid points and the inner grid point to a vertical direction virtual grid point, sets a horizontal direction external division point with respect to a corner direction outer grid point of the outer grid points and the vertical direction outer grid point to a temporary virtual grid point, and sets a vertical direction external division point with respect to the horizontal direction virtual grid point and the temporary virtual grid point to a corner direction virtual grid point.

12. The image sensing device of claim 11, wherein the gain calculation component calculates a gain of the corner direction outer grid point based on a gain of the vertical direction virtual grid point, a gain of the horizontal direction virtual grid point, a gain of the corner direction virtual grid point and a gain of the inner grid point.

13. The image sensing device of claim 12, wherein the gain calculation component calculates the gain of the corner direction outer grid point according to the following equation:

$$\text{gain}(x, y) = \frac{\left\{\begin{array}{l}\text{gain}(x_1, y_1) \times d_{x2} \times d_{y2} + \text{gain}(x_2, y_2) \times d_{x1} \times d_{y2} + \\ \text{gain}(x_3, y_3) \times d_{x2} \times d_{y1} + \text{gain}(x_4, y_4) \times d_{x1} \times d_{y1}\end{array}\right\}}{(d_{x1} + d_{x2}) \times (d_{y1} + d_{y2})}$$

where 'gain(x,y)' denotes the gain of the corner direction outer grid point, 'gain(x1,y1)' denotes the gain of the corner direction virtual grid point, 'gain(x2,y2)' denotes the gain of the vertical direction virtual grid point, 'gain(x3,y3)' denotes the gain of the horizontal direction virtual grid point, 'gain(x4,y4)' denotes the gain of the inner grid point, 'dx1' denotes a horizontal distance between the corner direction outer grid point and the temporary virtual grid point, 'dx2' denotes a horizontal distance between the vertical direction outer grid point and the corner direction outer grid point, 'dy1' denotes a vertical distance between the vertical direction virtual grid point and the corner direction outer grid point, and 'dy2' denotes a vertical distance between the horizontal direction outer grid point and the corner direction outer grid point.

14. The image sensing device of claim 12, wherein the gain calculation component sets the gain of each of the vertical direction virtual grid point, the horizontal direction virtual grid point and the corner direction virtual grid point to be the same as the gain of the inner grid point.

15. An image sensing device comprising:
an image sensor including a pixel array having a plurality of pixels; and
a grid gain circuit suitable for:
determining a grid region having a plurality of squares and a plurality of rectangles, which correspond to the pixel array during a calibration operation;
determining an inner area including the plurality of squares and an outer area including the plurality of rectangles, from the grid region;
determining corner regions of the outer area, each corner region including an inner grid point in the inner area and outer grid points;
determining virtual grid points such that each corner region has the same size as each square; and
calculating a gain of the outer grid points based on a gain of the inner grid point and a gain of the virtual grid points,
wherein the gain is associated with the calibration operation for balancing a pixel color level,
wherein the virtual grid points are virtually set to an outer area of each set of the outer grid points based on the outer grid points and the inner grid point.

16. The image sensing device of claim 15, wherein the virtual grid points are set to external division points with respect to the outer grid points and the inner grid point.

17. The image sensing device of claim 16, wherein a horizontal direction external division point with respect to a horizontal direction outer grid point of the outer grid points and the inner grid point is set to a horizontal direction virtual grid point.

18. The image sensing device of claim 17, wherein a vertical direction external division point with respect to a vertical direction outer grid point of the outer grid points and the inner grid point is set to a vertical direction virtual grid point.

19. The image sensing device of claim 18, wherein a horizontal direction external division point with respect to a corner direction outer grid point of the outer grid points and the vertical direction outer grid point is set to a temporary virtual grid point.

20. The image sensing device of claim 19, wherein a corner direction virtual grid point is set to a vertical direction external division point with respect to the horizontal direction virtual grid point and the temporary virtual grid point.

* * * * *